(12) United States Patent
Raghoebardajal et al.

(10) Patent No.: US 11,590,415 B2
(45) Date of Patent: Feb. 28, 2023

(54) HEAD MOUNTED DISPLAY AND METHOD

(71) Applicant: Sony Interactive Entertainment Inc., Tokyo (JP)

(72) Inventors: Sharwin Winesh Raghoebardajal, London (GB); Simon Mark Benson, London (GB)

(73) Assignee: Sony Interactive Entertainment Inc.

( * ) Notice: Subject to any disclaimer, the term of this patent is extended or adjusted under 35 U.S.C. 154(b) by 483 days.

(21) Appl. No.: 16/604,797

(22) PCT Filed: Apr. 26, 2018

(86) PCT No.: PCT/GB2018/051092
§ 371 (c)(1),
(2) Date: Oct. 11, 2019

(87) PCT Pub. No.: WO2018/203037
PCT Pub. Date: Nov. 8, 2018

(65) Prior Publication Data
US 2020/0316462 A1 Oct. 8, 2020

(30) Foreign Application Priority Data

May 4, 2017 (GB) .................................. 1707133

(51) Int. Cl.
*G06F 3/16* (2006.01)
*G06T 19/00* (2011.01)
(Continued)

(52) U.S. Cl.
CPC ............ *A63F 13/26* (2014.09); *A63F 13/213* (2014.09); *G06T 19/006* (2013.01);
(Continued)

(58) Field of Classification Search
CPC .............. G02B 27/017; G02B 27/0179; G02B 2027/0138; G06F 3/011; G06F 3/012;
(Continued)

(56) References Cited

U.S. PATENT DOCUMENTS

2013/0127980 A1 5/2013 Haddick et al.
2014/0139439 A1* 5/2014 Park .................... G06F 3/04886
345/169

(Continued)

FOREIGN PATENT DOCUMENTS

EP 2996017 A1 3/2016
GB 2544469 A 5/2017

(Continued)

OTHER PUBLICATIONS

Desai, A.P. et al, "A Window to your Smartphone: Exploring Interaction and Communication in immersive VR with Augmented Virtuality", 2017 14th Conference on Computer and Robot Vision (IEEE), pp. 217-224.*

(Continued)

*Primary Examiner* — Lawrence S Galka
(74) *Attorney, Agent, or Firm* — Lerner, David, Littenberg, Krumholz & Mentlik, LLP

(57) ABSTRACT

A system for displaying a mobile device screen comprises a head mounted display for displaying a first content to a user, a video camera mounted on the head mounted display, the video camera operable to capture a video image of a scene in front of the user, a region detection processor operable to detect a region of the captured video image comprising a mobile device screen, and an image processor operable to replace a corresponding region of the displayed first content in the head mounted display with the detected region of the captured video image comprising the mobile device screen.

15 Claims, 2 Drawing Sheets

(51) Int. Cl.
*H04N 13/332* (2018.01)
*A63F 13/26* (2014.01)
*A63F 13/213* (2014.01)
*H04N 13/128* (2018.01)
*H04N 13/15* (2018.01)
*H04N 13/271* (2018.01)
*H04N 13/344* (2018.01)

(52) U.S. Cl.
CPC ........... *H04N 13/128* (2018.05); *H04N 13/15* (2018.05); *H04N 13/271* (2018.05); *H04N 13/344* (2018.05)

(58) Field of Classification Search
CPC .. G06F 3/0346; G06F 3/04886; A63F 13/211; A63F 13/213; A63F 13/42; H04N 13/128; H04N 13/332; H04N 13/344; H04N 13/398; G06T 19/006; G05B 2219/39449
See application file for complete search history.

(56) References Cited

U.S. PATENT DOCUMENTS

| | | | | |
|---|---|---|---|---|
| 2015/0015459 | A1* | 1/2015 | Cho | H04M 1/72454 345/8 |
| 2015/0363976 | A1* | 12/2015 | Henson | H04N 13/279 345/419 |
| 2016/0267712 | A1* | 9/2016 | Nartker | G06F 3/011 |
| 2016/0292922 | A1* | 10/2016 | Kasahara | G06F 1/1694 |
| 2016/0363774 | A1* | 12/2016 | Kawasima | G02B 27/0179 |
| 2017/0011553 | A1 | 1/2017 | Chen et al. | |
| 2017/0076502 | A1 | 3/2017 | Chen et al. | |
| 2017/0372516 | A1* | 12/2017 | Evans | G06T 15/20 |

FOREIGN PATENT DOCUMENTS

| | | |
|---|---|---|
| JP | 5996814 B1 | 9/2016 |
| WO | 2015111283 A1 | 7/2015 |
| WO | 2016021252 A1 | 2/2016 |
| WO | 2016194844 A1 | 12/2016 |
| WO | 2017007637 A1 | 1/2017 |

OTHER PUBLICATIONS

International Search Report and Written Opinion of International Application No. PCT/GB2018/051092, dated Jul. 9, 2018.
Combined Search and Examination Report of Great Britain Application No. 1707133.3, dated Oct. 10, 2017.
European Communication including Written Opinion for Application No. 18722158.5 dated Jan. 3, 2022, pp. 1-7.
Notification of Reason for Refusal for Japanese Application No. 2019-558509 dated Jul. 5, 2022. 4 pgs.

* cited by examiner

HEAD MOUNTED DISPLAY AND METHOD

CROSS-REFERENCE TO RELATED APPLICATIONS

The present application is a national phase entry under 35 U.S.C. § 371 of International Application No. PCT/GB2018/051092, filed on Apr. 26, 2018, which claims the benefit of United Kingdom Priority Patent Application No. 1707133.3, filed on May 4, 2017, the disclosures of which are hereby incorporated herein by reference.

The present invention relates to a head mounted display and method.

Modern videogames can provide a very immersive experience, and recently this has been enhanced by the advent of virtual reality systems such as the Sony® head mounted display (HMD), which positions a stereoscopic display (e.g. left and right eye display screens) in front of the user's eyes to present them with stereoscopic content, and relays the current orientation of the HMD back to the content source (such as a Sony PlayStation 4 ®) so that it can change the displayed viewpoint to track the user's head movements. The subjective experience is that the user is immersed within the content and can look around freely. The content is typically a virtual environment of a videogame, but can equally be a panoramic photograph or video, or a combination of a virtual environment and pre-recorded content, such as a virtual cinema.

To achieve this, the user mush wear the HMD on their head such that it blocks their normal view of their local environment, and optionally requires further adjustment to comfortably rest on their head with the displays appropriately aligned with their eyes. As a result it is desirable to avoid unnecessarily removing and repositioning the HMD during play.

However, the user may still wish to perform real world activities that would normally require them to remove the HMD. One such activity is checking their phone, tablet or other mobile device for calls, texts and other content.

One solution is to synchronise the mobile device with the PlayStation® (for example through Bluetooth® or WiFi Direct®) so that notifications can be relayed to the PlayStation® and thereon to the HMD. However, this may require the installation of an app on the phone that has wide access to the content of the phone for this purpose, which may be seen as undesirable. Furthermore the communications may cause an increased power drain on the mobile device.

Consequently, there is a need for an alternative solution.

The present invention aims to address or mitigate the above problem.

In a first aspect, a system for displaying a mobile device screen is provided in claim 1.

In another aspect, a method of displaying a mobile device screen is provided in claim 12.

Further respective aspects and features of the invention are defined in the appended claims.

Embodiments of the present invention will now be described by way of example with reference to the accompanying drawings, in which.

A head mounted display and corresponding method is disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
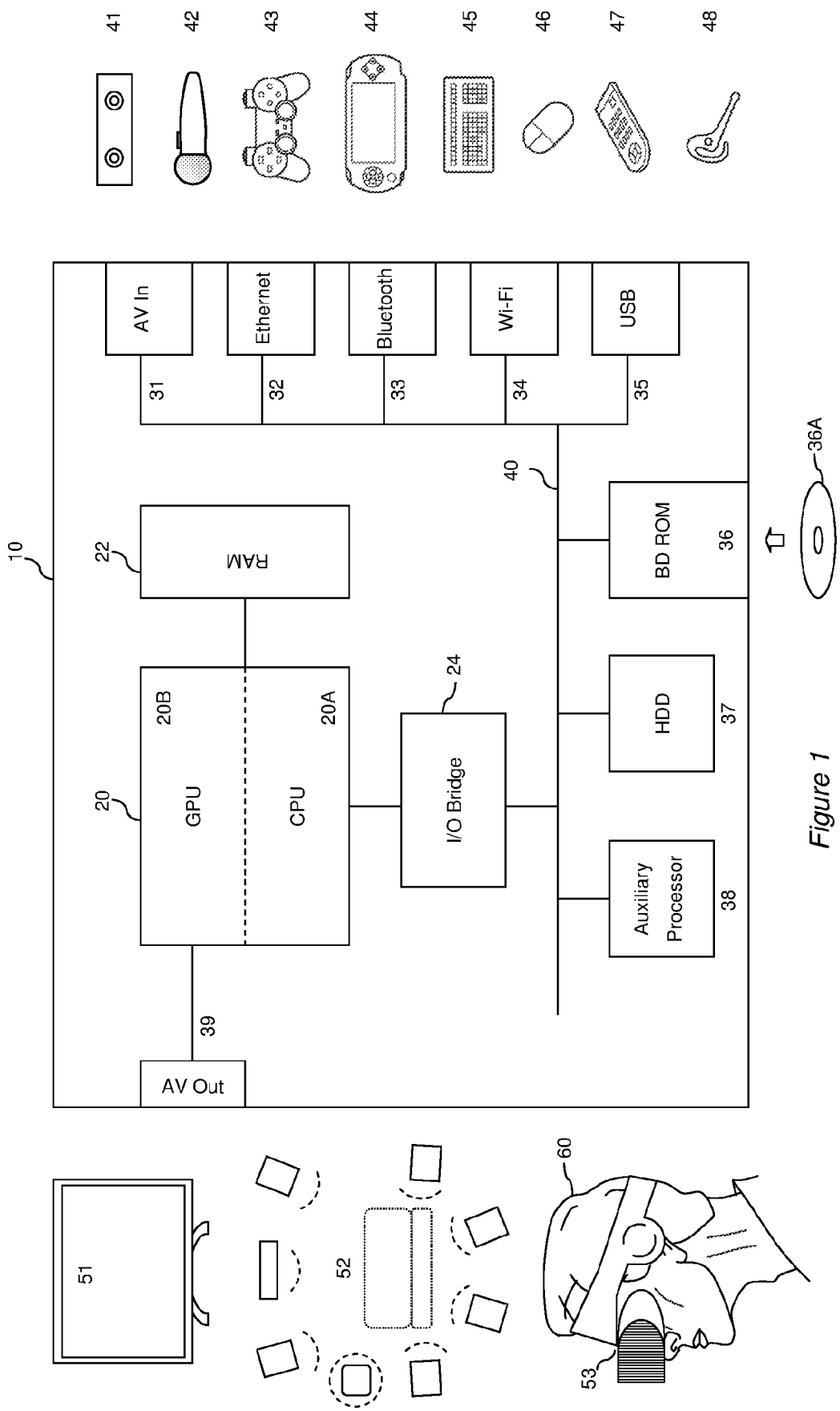
FIG. 1 is a schematic diagram of a head mounted display and videogame console in accordance with an embodiment of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move ® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

Regarding output, the GPU typically generates a 1080p high definition image to the AV output 39. The frame rate of these images may vary. The image is typically conveyed to a television 51 via a standard HDMI connection, optionally via an AV receiver (not shown). Where the television supports stereoscopic display, and optionally in response to a command from the user, the 1080p high definition may be formatted as a stereoscopic image for example using a left-right side-by-side format. The television will then split the image in two and interpolate each half to full width for respective presentation to the user's left and right eyes, either by use of specially adapted glasses or by use of directed light paths from an autostereoscopic display.

Optionally in conjunction with an auxiliary audio processor (not shown), the APU 20 generates audio for output via the AV output 39. The audio signal is typically in a stereo format or one of several surround sound formats. Again this is typically conveyed to the television 51 via an HDMI standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, the video and optionally audio may be conveyed to a head mounted display (HMD) 53 such as the Sony PlayStation VR® display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

The Sony PlayStation VR unit and the Sony PlayStation 4 represent non-limiting examples of the HMD and console described herein in relation to embodiments of the present invention.

Hence referring again to FIG. 1, in an embodiment of the present invention a system is provided for displaying a mobile device screen. The system comprises a head mounted display for displaying a first content to a user. The first content may be a videogame, live or pre-recorded video, a videoconference or telepresence feed or any other content suited to display by an HMD, such as a virtual book. The mobile device is typically any handheld device that has a screen, such as for example a phone, tablet or laptop, or some varieties of AV remote control, etc. The system comprises a head mounted display which may be operable to generate or receive content on its own (either as an integrated unit or by insertion/mounting of a separate mobile computing device, and/or it may comprise a videogame console, personal computer or cloud service that generates or receives the content before relaying it in some form to the HMD. Hence depending on the system (or the mode of use of a system), either the HMD or a remote device such as a videogame console or server can be the source of the first content.

The system further comprises a video camera mounted on the head mounted display, the video camera operable to capture a video image of a scene in front of the user. The video camera may be monoscopic or stereoscopic, and/or may implement depth detection using an ultrasound or infrared tape measure or through the projection of structured light (a predetermined pattern, typically in the near infra-red, whose projected scale on a surface in the captured scene is indicative of the distance of that surface from the camera). The camera may be any suitable resolution. The camera may be mounted by default horizontally on the HMD or alternatively to face downwards towards an area when the user's hands may be expected to be when holding a mobile device in normal use. The camera may also be pivotable up/down and/or left/right. Optionally a signal indicative of the amount of pivot may be generated by a sensor.

The output of the camera, optionally after compression or other encoding, is supplied to a region detection processor that is operable to detect a region of the captured video image comprising a mobile device screen.

The region detection processor may be a CPU of the HMD operating under suitable software instruction, or alternatively a CPU of a remote device such as the videogame console, PC or server, for example where this is the source of the first content, or a combination of such CPUs.

Techniques for detecting a region of the captured video image comprising a mobile device screen are described later herein.

If such a region is detected, then an image processor is operable to replace a corresponding region of the displayed first content in the head mounted display with the detected region of the captured video image comprising the mobile device screen.

Again the image processor may be a CPU and/or graphics processor of the HMD or other source of the first content operating under suitable software instruction.

The replacement may comprise superposition over an existing region of the first content (for example if the first content is received from a source device separate to the device hosting the image processor, as may be the case if the source is a videogame console and the image processor is in the HMD) or may be inserted into a render or re-projection process for example as a sprite or texture, such that the original region of the first content is not rendered or re-rendered (for example if the source of the first content is the device hosting the image processor, although it will be appreciated that either superposition or insertion is possible in this case).

In any event, the effect is that the region of the captured video image corresponding to the mobile device screen is incorporated into the displayed image(s) in the HMD.

Advantageously therefore, the user is able to look at information being presented on the screen of their mobile device simply by 'looking' at their device (i.e. orienting their head so that the video camera's field of view encompasses the display of their mobile device). Consequently, they do not need to remove their HMD or in some manner synchronise their mobile device with the HMD or the remote source of the first content in order to look at the contents of its screen.

As noted previously herein, the region detection processor may employ one technique or a plurality of techniques sequentially or in parallel as appropriate for detecting the region of the captured video image that comprises a mobile device screen.

In a first technique, the region detection processor detects the region of the captured video image comprising a mobile device screen, responsive to the brightness of the screen in the captured image.

Hence for example, an average brightness of the captured video image may be determined, and those image pixels having a brightness value that is a predetermined amount or proportion above that average may be selected. Alternatively or in addition an absolute brightness threshold may be used. A constraint that only pixels forming a contiguous region are selected may also be applied, as may a minimum pixel area threshold. Techniques for filling selection gaps within such a region may be employed (for example bloom) to account for the fact that displayed text of a mobile device may be black and hence corresponding pixels in the captured image may not have a qualifying brightness value. Alternatively, where a region of brightness has been identified, a quadrangle of pixels approximating the region may be selected, thereby encompassing all potential content within the bright region.

In any event, optionally the detected region may be expanded by a predetermined amount beyond the bright region in one or more directions. This enables the user to at least partially see their own hand or finger as it approaches the screen, which may facilitate texting or other touch based interactions. Optionally the user may be able to set the predetermined amount in one or more directions, so that for example a physical keyboard positioned below the display of the device (for example in the case of a Blackberry® device or some feature phones) is also captured within the detected region.

In another technique, the system comprises a distance detection processor. Again this may be a CPU of the HMD or a remote device operating under suitable software instruction, as applicable.

This processor may receive a distance measure from an IR or ultrasound tape measure associated with the camera, or compare the scale of a structured light pattern to a reference template at a known distance, or perform parallax detection on a stereoscopic image pair from the camera, where supplied, to detect distances of objects in the scene from the camera. An optional constraint is that the detected region is flat to within a threshold tolerance.

Where operating in conjunction with the first technique, such analyses may be limited to bright areas of the image (optionally identified with less restrictive brightness criteria, e.g. lower relative/absolute brightness thresholds), or vice-versa.

Based on the results of the distance detection processor, the region detection processor is then operable to detect the region of the captured video image comprising the screen responsive to the distance of the candidate region from the video camera.

Hence for example any bright region determined to be more than 1 metre from the camera (or a distance chosen to be representative of the arm's length of a representative portion of the population) may be excluded from consideration as a region corresponding to a mobile device screen.

This can assist with excluding potential false positives such as a television, window, light bulb or the like that may be present within the captured video image.

In conjunction with any of these techniques, optionally the system may comprise features intended to remove false-positive regions of the image that might otherwise be considered to be candidate screen regions within the captured video image.

Hence optionally the system may comprise an image correlator. Again this may be a CPU and/or graphics processor of the HMD or a remote source of the first content operating under suitable software instruction.

The image correlator is arranged to discount a candidate screen region within the captured video image that corresponds to an image currently being output to a secondary display by the source of the first content.

Hence for example where a videogame console outputs first content to the HMD and potentially also outputs the first content (or other, typically complementary content) to a television, for example so that friends can see what the user of the HMD is seeing, or otherwise monitor their progress/activities, the content of the screen is known to the source of the first content.

Therefore if the image correlator is located in the first content source device, it can compare a candidate screen region of the captured image with the known output of the television and if there is a correlation above a predetermined threshold then that candidate region can be discounted.

Meanwhile, if the image correlator is located in the HMD and this is not the source of the image being displayed on the television, then optionally a reduced-resolution proxy image of the image displayed on the television can be relayed to the HMD, for example as metadata, for a similar correlation, threshold and conditional discounting process to be conducted by the HMD.

In a similar manner to the image correlator, optionally a control correlator may be arranged to discount as a candidate screen region any light source having one or more selected from the list consisting of a colour, and a position, corresponding to a light emitting control device currently associated with the first content source.

Hence when operating in conjunction with any of the above described techniques, if a candidate region (for example selected due to brightness and/or position) correlates with a known colour of a light on a controller (for example the colour of the light on a PlayStation Move® controller or Dual Shock 4 ® controller as set by a PS4)—and also potentially a known shape of the light, particularly in the case of the spherical Move controller—then that region may be discounted. Alternatively or in addition, optionally if the region of the captured image is calculated to correspond to the calculated position of such a controller (for example based on motion detection telemetry from the HMD and controller, and/or image analysis of a remote camera), then that region may be discounted.

Again optionally, the system may comprise a calibration processor. Again this may be a CPU and/or graphics processor of the HMD or of a remote source of the first content operating under suitable software instruction.

Optionally the calibration processor is arranged to record the relative position with respect to the head mounted display of light sources within the captured video images for at least a first predetermined period of time, and to discount these light sources as candidate screen regions within subsequently captured video images.

Hence for example, a light-map of the environment local to the user may be generated during a first predetermined period of time corresponding to a calibration step. This may be a formal calibration process in the sense of informing the user and asking them to look around themselves, or within a predetermined area, and then storing where bright regions are found with respect to the HMD, based on correlating such bright regions with motion telemetry from the HMD and/or from image analysis of a remote camera feed. Alternatively a first predetermined period may be when it is reasonable to assume that the user is not holding a mobile device for the purposes of looking at its screen. Hence for example, when two hand held controllers are detected to be in use (such as left and right Move controllers), or a two-handed controller (such as the DualShock 4) is detected to be in use. In this way, potentially over successive periods, a light map may be built up. Optionally where possible a corresponding distance map may also be built.

Subsequently, a candidate bright region in a captured video image can be discounted if it coincides with a region of the light map, optionally except when the distance of the candidate region in the captured video image is closer than the bright region of the light map, where this information is available, as this may indicate a mobile device being held in front of a background bright region.

Again optionally, the system may comprise an orientation detector. Typically this may be an accelerometer and/or gyroscopic sensor of the HMD, or may comprise a CPU and/or graphics processor of the HMD or a remote source of the first content operating under suitable software instruction to determine orientation from the captured video images using optical flow techniques or similar.

In any event, in this case then optionally the region detection processor is operable to only detect a region of the captured video image comprising a mobile device screen when the head mounted display is facing below a predetermined angle with respect to the horizontal.

This therefore assumes that the user does not hold their screen up to head height, but rather that they look down to a screen held typically between chest and waist height when standing, and typically between neck and waist height when sat down.

Advantageously this may eliminate numerous sources of light from consideration, such as for example ceiling lights and most windows.

Similarly the region detection processor may only detect a region of the captured video image when the HMD is within a threshold angle of a central position (i.e. to within +/−N degrees left or right of a default position facing directly forward). This similarly assumes that the user does not hold their screen to the left or right of their face, but instead generally holds it centrally in front of them.

The combination of a threshold angle from the horizontal and threshold lateral angles can form a rectilinear area within the user's environment in which to perform region detection (or equally outside which to discount candidate regions), that advantageously will exclude many if not all light sources other than a mobile device screen.

Using any suitable combination of detection techniques and rejection/discounting/exclusion methods described previously herein, a candidate region of the captured image may then be selected for display to the HMD.

Clearly it is desirable that the image of the screen as incorporated into the HMD image also tracks the user's head movements. It will be appreciated that this happens automatically within the captured video image, as the camera in the HMD moves relative to the mobile device screen as the user moves their head and/or hand.

Hence in an embodiment of the present invention, the image processor is operable to select the region of the displayed first content in the head mounted display to be superposed/replaced with the corresponding region of the captured video image by transposing the location of the selected screen region within the captured video image to a corresponding location within a display of the head mounted display.

Optionally, back-projection processing may be performed to map any translation of the screen region across the captured video image so that it is consistent with the position of the user's eyes rather than the position of the camera. However, when the user's head is relatively static, the effect of such correction is small.

It will be appreciated that the HMD typically has a stereoscopic pair of displays. Consequently, the image processor may be adapted to select a region for each display with a relative offset to generate a predetermined parallax.

Preferably, the parallax corresponds to the distance of the device screen from the HMD camera (or the user's eyes, particularly if back—projection is used as described above), as this helps with the user's proprioception and kinaesthetic sense of where the screen and their hands are in relation to their head/body.

Hence the relative offset may be one selected from the list consisting of a distance value obtained by a distance detection processor as described previously herein, and where this is not available, a predetermined offset corresponding to an average distance at which a user holds a mobile device away from the video camera during normal use.

It will be appreciated that if the video camera is a stereoscopic video camera, then the relative offset can be a function of the relative offset of the screen within the stereoscopic images from the video camera.

Figure 2:
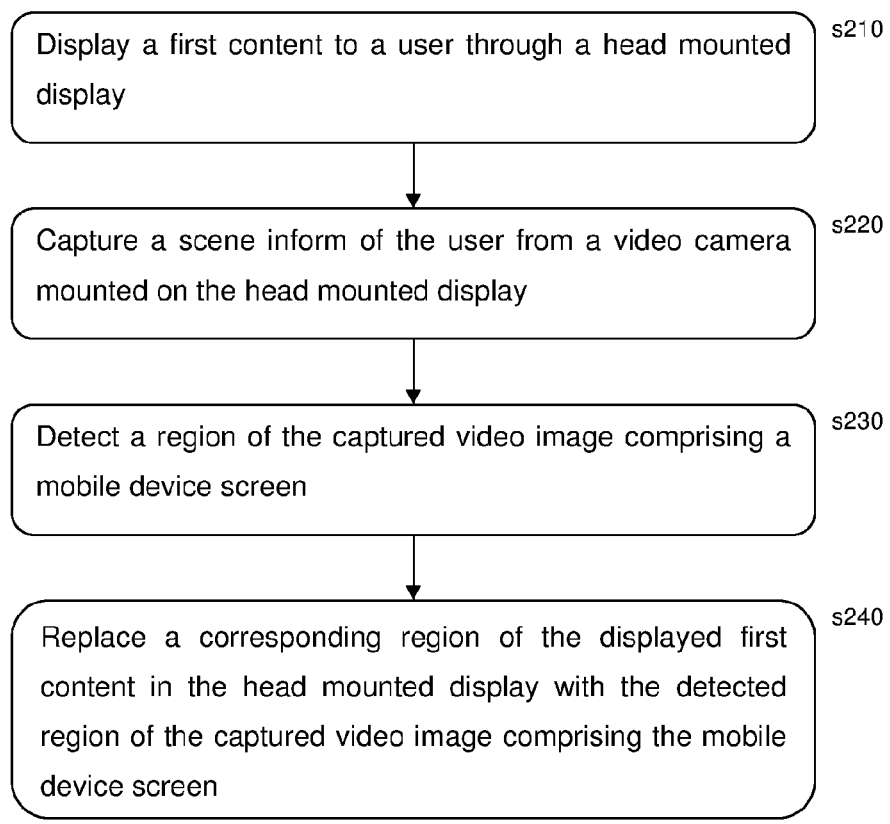
FIG. 2 is a flow diagram of a method of displaying a mobile device screen in accordance with an embodiment of the present invention.

Referring now to FIG. 2, a method of displaying a mobile device screen comprises:

In a first step s210, displaying a first content to a user through a head mounted display;

In a second step s220, capturing a scene inform of the user from a video camera mounted on the head mounted display:

In a third step s230, detecting a region of the captured video image comprising a mobile device screen; and In a fourth step s240, replacing a corresponding region of the displayed first content in the head mounted display with the detected region of the captured video image comprising the mobile device screen.

It will be appreciated that the detailed implementation of the above method may correspond as appropriate to the above previously disclosed techniques and methods in any suitable combination.

Hence the detecting step s230 may comprise one or more selected from the list consisting of selecting a candidate region of the video image responsive to the comparative brightness of the image to a background region of the video image, selecting a candidate region of the video image responsive to a detected distance of the region from the video camera, discounting a candidate region of the video image that correlates with known output from the source of the first content, discounting a candidate region of the video image that has a colour and/or position corresponding to a known light emitting control device currently associated with the first content source, and discounting a candidate region of the video image having a position corresponding to a light source identified during a calibration step.

Similarly the method may comprise a step s225 of detecting an orientation of the head mounted display, and the step 230 of detecting a region of the captured video image may comprise a mobile device screen is responsive to whether the head mounted display is facing below a predetermined angle with respect to the horizontal.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machinereadable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet. or any combination of these or other networks.

The invention claimed is:

1. A system for displaying a mobile device screen, comprising:
    a head mounted display for displaying a first content to a user;
    a video camera mounted on the head mounted display, the video camera operable to capture a video image of a scene in front of the user;
    a region detection processor operable to detect a screen region of the captured video image comprising a mobile device screen; and
    an image processor operable to replace a corresponding region of the displayed first content in the head mounted display with the detected screen region of the captured video image comprising the mobile device screen.

2. The system of claim 1, in which the region detection processor is operable to detect the screen region of the captured video image comprising a mobile device screen responsive to the brightness of a candidate screen region in the captured image.

3. The system of claim 1, comprising
    a distance detection processor, and in which
    the region detection processor is operable to detect the screen region of the captured video image comprising the screen responsive to the distance of a candidate screen region from the video camera.

4. The system of claim 1, comprising
    an image correlator arranged to discount a candidate screen region within the captured video image that corresponds to an image currently being output to a secondary display by the source of the first content.

5. The system of claim 1, comprising
    a control correlator arranged to discount as a candidate screen region any light source having one or more selected from the list consisting of:
    i. a colour; and
    ii. a position,
    corresponding to a light emitting control device currently associated with the first content source.

6. The system of claim 1, comprising
    a calibration processor arranged to record the relative position with respect to the head mounted display of light sources within the captured video images for a first predetermined period of time, and to discount these light sources as candidate screen regions within subsequently captured video images.

7. The system of claim 1, comprising
    an orientation detector, and in which
    the region detection processor is operable to only detect a screen region of the captured video image comprising a mobile device screen when the head mounted display is facing below a predetermined angle with respect to the horizontal.

8. The system of claim 1, in which
    the image processor is operable to select the region of the displayed first content in the head mounted display to be replaced with the corresponding screen region of the captured video image by transposing the location of the screen within the captured video image to a corresponding location within a display of the head mounted display.

9. The system of claim 8, in which
    if the head mounted display has a stereoscopic pair of displays, the image processor is adapted to select a region for each display with a relative offset to generate a predetermined parallax.

10. The system of claim 9, in which
    the relative offset is one selected from the list consisting of:
    i. a predetermined offset corresponding to an average distance at which a user holds a mobile device away from the video camera during normal use; and
    ii. a distance value obtained by a distance detection processor.

11. The system of claim 9, in which
    the video camera is a stereoscopic video camera; and
    the relative offset is a function of the relative offset of the screen within the stereoscopic images from the video camera.

12. A method of displaying a mobile device screen, comprising the steps of:
    displaying a first content to a user through a head mounted display;
    capturing a scene in front of the user from a video camera mounted on the head mounted display;
    detecting a screen region of the captured video image comprising a mobile device screen; and
    replacing a corresponding region of the displayed first content in the head mounted display with the detected screen region of the captured video image comprising the mobile device screen.

13. The method of claim 12, in which the detecting step comprises one or more selected from the list consisting of:
    i. selecting a candidate screen region of the video image responsive to the comparative brightness of the image to a background region of the video image;
    ii. selecting a candidate screen region of the video image responsive to a detected distance of the region from the video camera;
    iii. discounting a candidate screen region of the video image that correlates with known output from the source of the first content;
    iv. discounting a candidate screen region of the video image that has a colour and/or position corresponding to a known light emitting control device currently associated with the first content source; and
    v. discounting a candidate screen region of the video image having a position corresponding to a light source identified during a calibration step.

14. The method of claim 12, comprising the step of:
    detecting an orientation of the head mounted display;
    and in which the step of detecting a screen region of the captured video image comprising a mobile device screen is responsive to whether the head mounted display is facing below a predetermined angle with respect to the horizontal.

15. A non-transitory computer readable medium having computer executable instructions adapted to cause a computer system to perform the method of claim 12.

* * * * *